(12) United States Patent
Vanderhye et al.

(10) Patent No.: US 7,241,105 B1
(45) Date of Patent: Jul. 10, 2007

(54) WATERCRAFT WITH VERTICALLY COLLAPSIBLE VERTICAL AXIS WIND TURBINE AND PROPELLER FLEXIBLE DRIVE SHAFT

(76) Inventors: Robert A. Vanderhye, 801 Ridge Dr., McLean, VA (US) 22101; Nicholas C. S. Applegate, 64 9th St., Troy, NY (US) 12180; Douglas M. Dukes, 79B 11th St., Troy, NY (US) 12810; Nicholas J. Leone, 908 Jacob St., Troy, NY (US) 12180; Joseph Sedlak, 15 Clark Ave., Rutherford, NJ (US) 07070; Jason Signor, 1999 Burdett Ave., Troy, NY (US) 12180; Mark W. Steiner, 21 Gullane Dr., Slingerlands, NY (US) 12159; Timothy Vanderpoel, 1999 Burdett Ave., Troy, NY (US) 12180

( * ) Notice: Subject to any disclaimer, the term of this patent is extended or adjusted under 35 U.S.C. 154(b) by 649 days.

(21) Appl. No.: 10/443,961

(22) Filed: May 23, 2003

Related U.S. Application Data

(60) Provisional application No. 60/386,569, filed on Jun. 7, 2002.

(51) Int. Cl.
*F03B 15/06* (2006.01)
(52) U.S. Cl. .......................... 415/4.2; 415/4.4
(58) Field of Classification Search ................. 415/4.1, 415/4.2, 4.3, 4.4, 4.5
See application file for complete search history.

(56) References Cited

U.S. PATENT DOCUMENTS

| 1,466,026 A | 8/1923 | Manning |
| 1,471,870 A | 10/1923 | Tust |
| 2,677,344 A | 5/1954 | Annis |
| 3,596,624 A | 8/1971 | Lay |
| 4,191,507 A * | 3/1980 | DeBerg ...................... 416/117 |

(Continued)

OTHER PUBLICATIONS

"21st Century Multihulls"; Norwood, Jr.; AYRS 120-1; 1996; Chapter 5, "Wind & Water Turbines".

(Continued)

*Primary Examiner*—Hoang Nguyen

(57) ABSTRACT

A vertically collapsible vertical axis wind turbine may be used on land, or on a watercraft (e.g. a multihull such as a catamaran). The turbine may include a substantially vertical shaft; at least two vane supports mounted by the shaft; and at least two vertically collapsible material vanes supported by the vane supports, so that the vanes are movable from a first operative position in which the vane material is substantially taut, to a second inoperative position in which the vane material collapses. The vane supports are positioned, and the vanes are constructed, so that the wind turbine preferably has a Savonius or an open helix configuration. When used on multihull watercraft a propulsion mechanism is mounted between two of the hulls, and there is an operative connection between the wind turbine shaft and the propulsion mechanism. The operative connection may be a flexible shaft having at least about a 70 (e.g. about 90) degree bend therein. The propulsion mechanism may be a horizontal large diameter propeller mounted so that during normal loading of the watercraft roughly half of the propeller is in water and roughly half is out of water. Optionally, at least some portions of the hulls which normally engage water are made of marine grade polyethylene, which has low friction.

21 Claims, 7 Drawing Sheets

U.S. PATENT DOCUMENTS

| | | | |
|---|---|---|---|
| 4,274,011 A | | 6/1981 | Garfinkle |
| 4,342,539 A | * | 8/1982 | Potter ............................ 416/9 |
| 4,348,594 A | * | 9/1982 | Lipfert ........................ 290/54 |
| 4,353,702 A | | 10/1982 | Nagy |
| 4,406,584 A | * | 9/1983 | Stepp .......................... 416/41 |
| 4,422,825 A | * | 12/1983 | Boswell .................. 416/132 B |
| 4,500,259 A | * | 2/1985 | Schumacher ................ 416/122 |
| 4,522,600 A | * | 6/1985 | Jost ................................ 440/8 |
| 4,553,037 A | * | 11/1985 | Veazey ........................ 290/55 |
| 4,624,624 A | | 11/1986 | Yum |
| 4,718,822 A | | 1/1988 | Riezinstein |
| 4,832,571 A | | 5/1989 | Carrol |
| 4,993,348 A | * | 2/1991 | Wald .......................... 114/265 |
| 5,171,127 A | * | 12/1992 | Feldman et al. ............. 416/119 |
| 5,252,029 A | * | 10/1993 | Barnes ....................... 416/142 |
| 5,807,148 A | | 9/1998 | Siviero |
| 5,820,464 A | | 10/1998 | Parlato |
| 6,293,835 B2 | | 9/2001 | Gorlov |
| 2002/0192068 A1 | | 12/2002 | Selsam |

OTHER PUBLICATIONS

"Autogiro Boats", Dec. 5, 1995, Sinclair; www.users.globalnet.co.uk/-fsinc/yachts/auto/index.htm.

Popular Science, Jul. 1933 "New Rotor Ship Sails In Lightest Wind", reprinted at www.rexresearch.com/boats/1boat.htm.

\* cited by examiner

WATERCRAFT WITH VERTICALLY COLLAPSIBLE VERTICAL AXIS WIND TURBINE AND PROPELLER FLEXIBLE DRIVE SHAFT

CROSS REFERENCE TO RELATED APPLICATIONS

This application claims the priority of U.S. provisional application 60/386,569 filed Jun. 7, 2002.

BACKGROUND AND SUMMARY OF THE INVENTION

There have been proposals for wind turbine and autogiro boats for more than a century. Wind turbine boats typically use a horizontal or vertical axis wind turbine to drive a propeller, which in turn powers the boat, while autogiro boats use thrust forces on rotating vanes directly to power a boat. The promise has always been that one need not know how to sail to operate a wind turbine boat, and can move directly into the wind, and directly downwind faster than the wind speed. While there have been many proposals, instances of practical use of these technologies are few and far between. In fact, the Amateur Yacht Research Society publication AYRS 120-1 (pages 48-64) actually suggests that a horizontal axis wind turbine multihull boat is impractical, and cannot go directly into the wind.

The failure of practical application of wind turbine technology to watercraft may be due to a failure to properly meld existing components into an optimum combination. The failure may also be due to the failure to produce enough effective power for moving the boat due to power transmission losses, incorrect selection of the wind turbine configuration, what to do with the wind turbine when docked, or a combination of these and other factors. In any event, according to one aspect of the present invention, a wind turbine watercraft is constructed that will be operational and can power directly into the wind, and overcomes all of the difficulties mentioned above. However the invention is not limited to a wind turbine watercraft alone, but rather includes as separate and distinct concepts: a collapsible vertical axis wind turbine in general (for use on land as well as with a watercraft); a suitable material and shape for catamaran (or other multihull) hulls of a watercraft; and a power transmitting mechanism with little or no power transmission loss.

According to one aspect of the present invention, there is provided a vertically collapsible vertical axis wind turbine comprising: a substantially vertical shaft; at least two vane supports mounted by the shaft; and at least two vertically collapsible material vanes supported by the vane supports, so that the vanes are movable from a first operative position in which the vane material is substantially taut, to a second inoperative position in which the vane material collapses. The vane supports may be positioned, and the vanes are constructed, so that the wind turbine has an open helix configuration, or a Savonius configuration, or other conventional vertical axis wind turbine configurations.

Preferably the at least one of the vane supports comprises a first vane support mounted to the shaft by a locking device, the locking device removable to allow movement of the first vane support with respect to other vane supports along the shaft. The first vane support may comprise the top vane support. There may be at least three vane supports vertically spaced from each other on the shaft, including a second vane support mounted to the shaft by a removable locking device. The locking device may comprise a locking pin extendable through aligned substantially horizontal openings in the shaft and first (and second) vane support(s).

Each vane support may comprise a hub having a central substantially vertical bore, and a plurality of curved spokes extending generally radially outwardly from the hub and operatively connected to a vane. Preferably, the hub central bore and the shaft have at least one radially extending projection and vertically elongated groove which cooperate to key the vane support to the shaft (for example the at least one radial projection is in the hub central bore and the at least one vertically elongated groove is in the shaft). Each vane support may have four spokes space substantially uniformly around the hub. The spokes of the lowest vane support on the shaft may have a significantly smaller radial dimension than the spokes of a vane support above them, so that the vane is tapered radially inwardly from the above vane support to the lowest vane support.

The vanes may be made of kite or high performance sail material. At least one vane optionally includes at least one substantially vertical or substantially diagonal batten therein.

According to another aspect of the present invention there is provided a multihull watercraft comprising: a plurality of hulls; a propulsion mechanism mounted between two of the hulls; a vertically collapsible vertical axis wind turbine operatively fore mounted to at least one hull, the wind turbine having a shaft; and an operative connection between the wind turbine shaft and the propulsion mechanism. The vertically collapsible vertical axis wind turbine may comprise a Savonius wind turbine or an open helix wind turbine, and may have the details of construction described above. That is the wind turbine may comprise at least two vane supports mounted by the shaft; and at least two vertically collapsible material vanes supported by the vane supports, so that the vanes are movable from a first operative position in which the vane material is substantially taut, to a second inoperative position in which the vane material collapses. The propulsion mechanism may comprise a horizontal propeller and the operative connection between the wind turbine shaft and propeller may comprise a flexible shaft having at least about a 70 degree (e.g. about 90 degree) bend therein. The propeller may have a diameter of between about 10-14 inches, and may be mounted so that during normal loading of the watercraft roughly half of the propeller is in water and roughly half is out of water. Also, at least portions of the hulls which normally engage water may be made of low friction marine grade polyethylene (Roplene®).

According to another aspect of the invention there is provided a watercraft comprising: a watercraft body (e.g., but not necessarily, a multihull); a vertical axis wind turbine having a substantially vertical shaft mounted with respect to the body for rotation with respect to the body; a horizontal propeller mounted to the body for rotation about a generally horizontal axis, and a flexible shaft having at least about a 70 degree (e.g. about 90 degree) bend therein operatively connecting the wind turbine shaft to the horizontal propeller. A clutch may be provided between the wind turbine shaft and the flexible shaft, the clutch positioned above the flexible shaft bend.

The invention, and its various aspects, will be described more fully—but in a non-limiting manner—with respect to the included drawings.

DETAILED DESCRIPTION OF THE DRAWINGS

Figure 1:
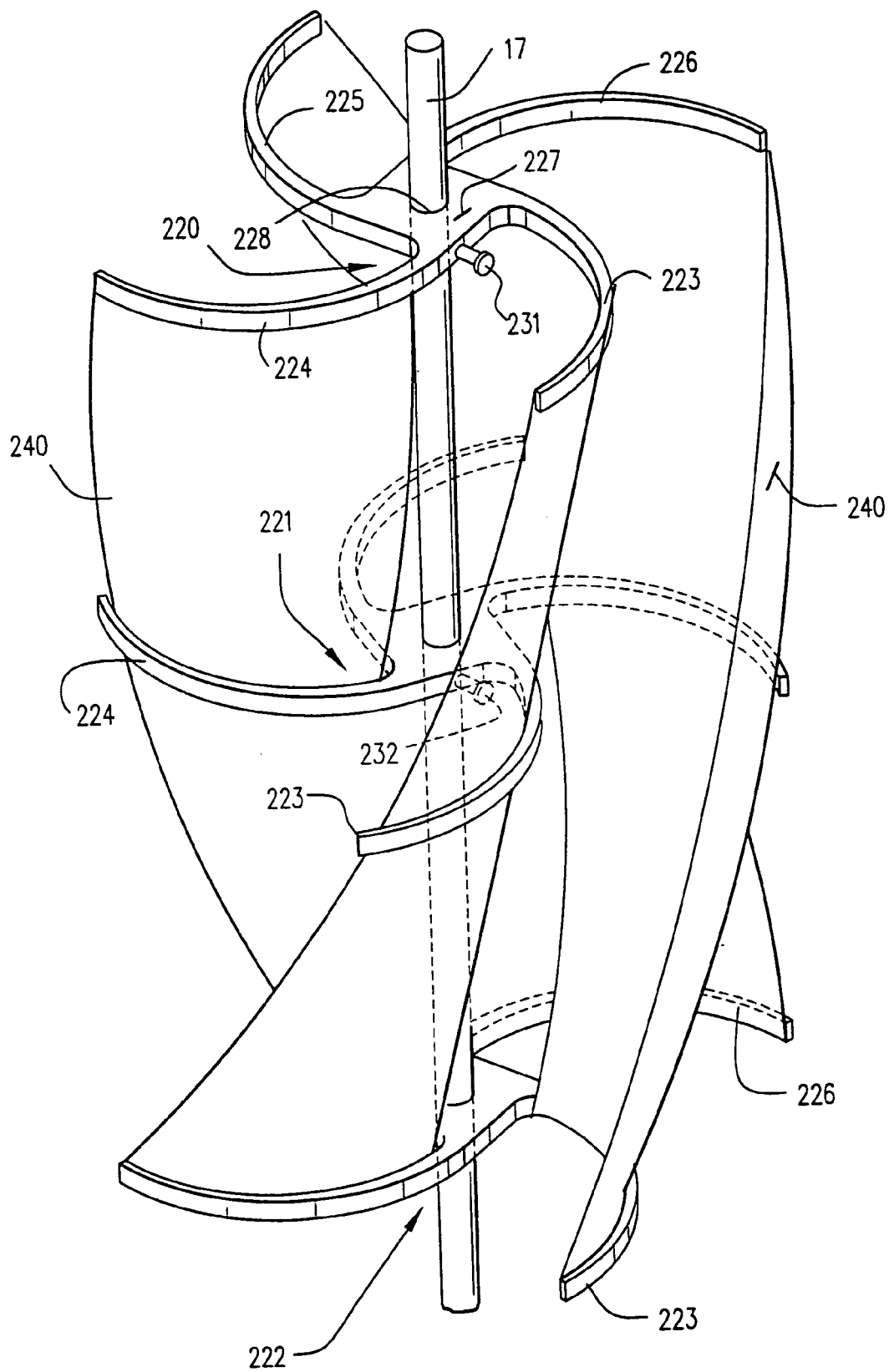
FIG. 1 is a schematic top perspective view of a open helix form of a collapsible vertical axis wind turbine according to the invention.
Figure 2:
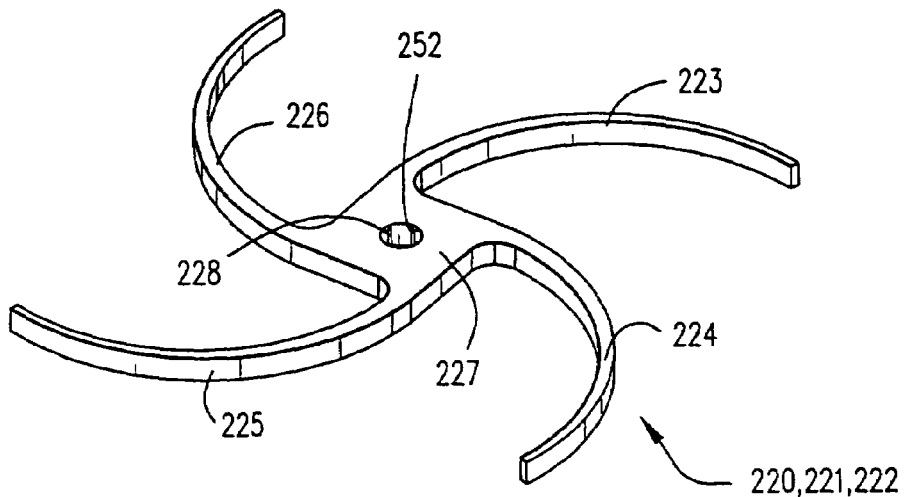
FIGS. 2-4 are perspective, top, and end views of an exemplary vane support used with the collapsible vertical axis wind turbines of FIGS. 1, 5 & 6.
Figure 3:
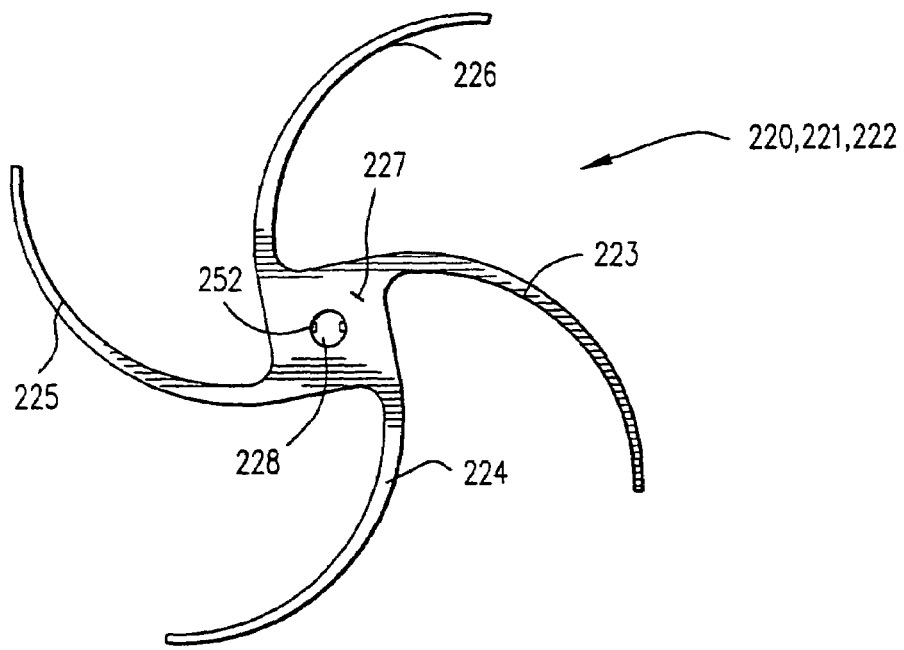
Figure 4:
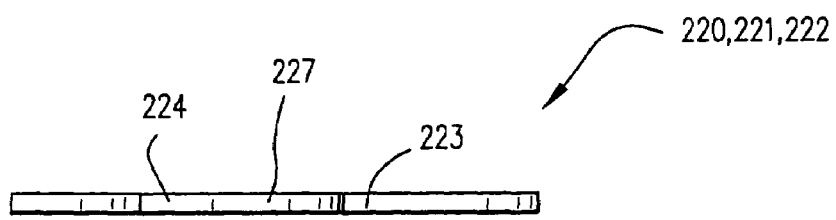

In the drawings, the following reference numerals correspond to the following structures:

| | |
|---|---|
| 10 | Watercraft |
| 11, 12 | Hulls of boat 10 |
| 13 | Fore crossbar |
| 14 | Aft crossbar |
| 15 | Vertical axis wind turbine in general |
| 17 | Wind turbine shaft |
| 18 | Shaft 17 bearing(s) |
| 45 | Horizontal propeller |
| 64 | Rudders |
| 215 | Vertically collapsible wind turbine |
| 215' | Modified vertically collapsible wind turbine (other primed reference numerals are the FIG. 7 modified forms of the original reference numeral structures): |
| 220-222 | Vane supports |
| 223-226 | Spokes |
| 227 | Vane support hub |
| 228 | Central vertical bore |
| 229 | Pin-receiving horizontal bore |
| 231, 232 | Locking pins |
| 233 | Holes in shaft 17 for pins |
| 234 | Pin projections |
| 235 | Pin actuator rod |
| 236 | Pin shaft |
| 238 | Pin screw threads |
| 239 | Pin head |
| 240 | Vane |
| 242, 243 | Battens |
| 245 | Vane material top end |
| 246 | Vane material bottom end |
| 247 | Stitching |
| 248 | Fastener (staple) |
| 249 | Pocket material |
| 250 | Stitching |
| 252 | Elongated projections (keys) |
| 253 | Shaft grooves |
| 260 | Flexible shaft |
| 261 | Clutch |
| 262 | Clutch tube |
| 263 | Clutch serrations |

-continued

| | |
|---|---|
| 264 | Clutch grooves |
| 265 | Clutch actuator |
| 266 | Clutch collar |
| 270 | Bend in shaft 260 |
| 271 | Bearing elements |
| 272 | Cross pieces |
| 273 | Bearing |
| 274 | Cross piece |

Figure 5:
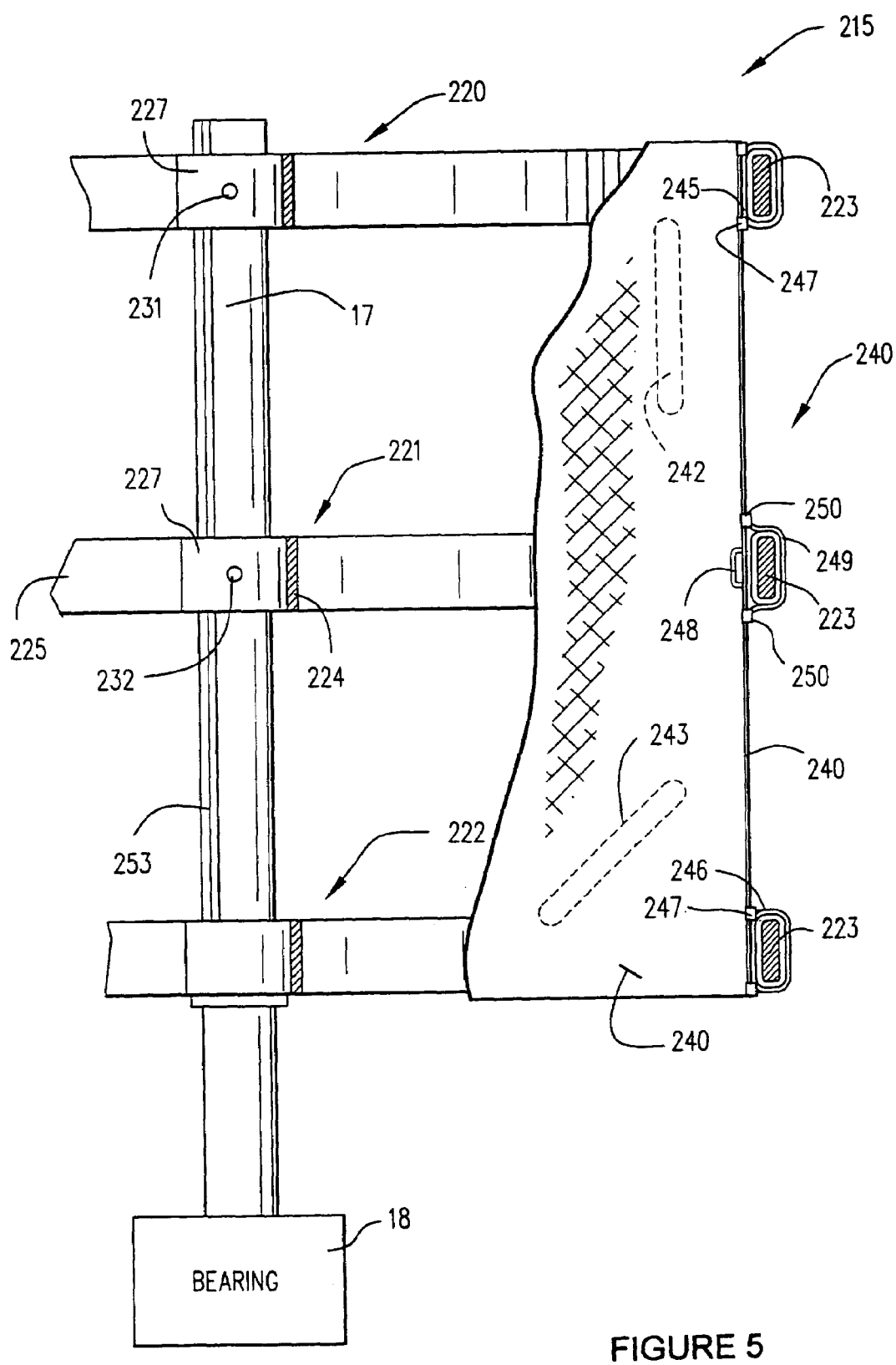
FIG. 5 is a side view, partly in cross section and partly in elevation, of the operative position of a Savonius form of collapsible vertical axis wind turbine according to the present invention, which uses the vane supports of FIGS. 2-4.
Figure 6:
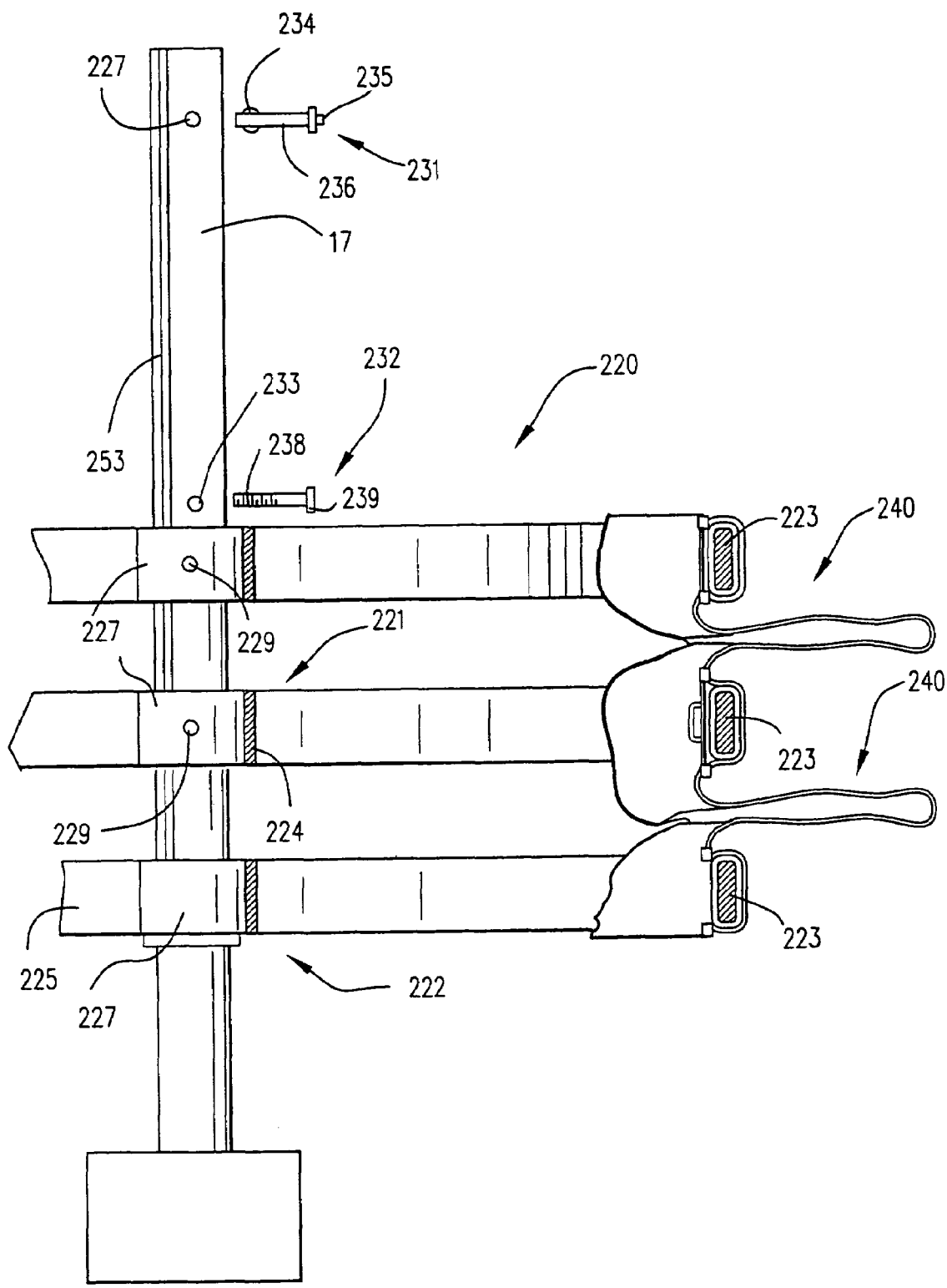
FIG. 6 is a view like that of FIG. 5 only showing the wind turbine in a collapsed position.

FIG. 1 illustrates a vertically collapsible form of a vertical axis wind turbine 215 that may be mounted on a multihull craft 10 as the turbine 15, according to the invention, or may be used anywhere that a wind turbine is useful (e.g. on land). The wind turbine 215 of FIG. 1 has an open helix construction, but merely be rearranging the relative orientation of the vane supports and the design of the vanes thereof (as hereinafter described) the same basic structure can be used for a Savonius wind turbine, as seen in FIGS. 5 and 6. Other designs of vane supports and vanes may be utilized to provide other conventional forms of vertical axis wind turbines. The vane supports and shaft 17 are common in FIGS. 1-6 and will use the same reference numerals. The configuration of the vanes is different in FIG. 1 on one hand, and FIGS. 5 & 6 on the other, and will use different reference numerals.

There are many instances in which a vertically collapsible vertical axis wind turbine 215 is desirable. Whenever it is desired to quickly deactivate the wind turbine—such as at a dock if the turbine 215 is mounted on a multihull craft 10, or when damaging high winds exist in land-based environments—a collapsible design is suitable. The vertical collapsibility of the turbine 215 is provided by the use of spaced vane supports, and flexible vanes.

In the embodiment illustrated in FIGS. 1-6, a plurality of vane supports 220, 221, and 222 are provided on a substantially vertical shaft 17. The shaft 17 may be connected to a propulsion system when used on a watercraft 10, or to a pump, generator, or other suitable mechanism when on land. While three vane supports 220-222 are illustrated in the drawings, it should be understood that two, four, or more, vane supports may be provided on a given shaft 17.

In the embodiment of the vane supports illustrated, each vane support 220-222 is illustrated as having four spokes 223, 224, 225, and 226, a central hub 227 form which the spokes 223 etc. generally radially extend, a concentric substantially vertical (during use) central bore 228 in the hub 227, and for at least the vane supports 220, 221 a substantially horizontal (during use) bore 229 extending from the exterior of the hub 227 to the central bore 228. However, two, three, or more than four spokes 223, etc., may be used depending upon the particular circumstances. Also, more than one horizontal bore 229 may be used. The vane supports 220-222 may be made of any suitable material, one that preferably has low weight, high strength, and high rigidity so that there is little deformation of the spokes 223, etc. during use. Hard plastic (such as Lexan), or lightweight corrosion-resistant metal (such as titanium or aluminum), are examples of suitable materials.

While the spokes 223-226 are illustrated in the drawings having shapes approximating an overlapping vane Savonius design (see "Making a simple Savonius wind turbine" by Lance Turner, viewable at www.ata.org.au), the spokes 223 etc. could have more conventional and/or pronounced curvatures, especially if only two spokes are provided on each vane support 220-222. That is the spokes 223 etc. of the vanes supports 220-222 may have a more classic "S-rotor" configuration (most conventional Savonius type).

The turbine 215 is made collapsible by using flexible vanes supported by the spokes 223-226, and by mounting at least the top or bottom vane support 220-221 so that it may be readily moved from an operative position (FIGS. 1 & 5) to a collapsed position (FIG. 6). For example, as seen in FIGS. 1, 5 & 6, the top and middle vane supports 220, 221, are cooperable with locking pins 21, 22 (see FIG. 6), which in turn cooperate with aligned substantially horizontal holes 23 formed in the shaft 17 to hold the vane supports 220, 221 in the operable position (FIGS. 1 & 5).

The pin 231 is shown as a conventional quick release pin which has projections 234 extending outwardly from pin shaft 236 which engage the interior wall of shaft 17 (If the shaft 17 is hollow), or interior cavities of the shaft 17, when the actuator rod 235 is extended, but which move inwardly to a non-engaging position when the rod 235 is depressed. The pin 232 is exteriorly screw-threaded, as indicated at 238, so that it cooperates with corresponding interior threads (not shown) in an opening 233. The head 239 of the pin 232 may have a screwdriver-receiving slot, a polygon shape for grasping by a wrench, wings for turning by hand, or another conventional construction. Normally only one type of pin (231 or 232) will be used with a particular shaft 17.

The turbine 215 has as many vanes 240 as spokes 223-226 on one vane support 220-222. A vane 240 is mounted by a spoke 223-226 of each of the vane supports 220-222. For example, the spokes 223 of all of the vane supports 220-222 mount one vane 240, the spokes 224 another vane 240, etc. Each vane 240 is flexible. That is, the vane 240 is of sheet (or like) material that will bend, fold, or otherwise move, to a configuration such as illustrated in FIG. 6. However, the material of which the vane 240 is made is not itself extensible. That is, the material of the vanes 240 is preferably substantially inextensible, such as the material that commercial kites or high performance sails are made of, so that the material maintains its shape when impacted by even high velocity wind when in the operable position (FIGS. 1 & 5). Certain types of metal, or metal laminated to cloth and/or plastic, also may be suitable. Also, vertical, horizontal, and/or diagonal stiffening battens (e.g. of hard plastic or metal) may be mounted with the vane 240 material (e.g. in pre-formed pockets) between the vane supports 220, 221 and 221, 222, when in the operable position (and removed before movement to the collapsing position of FIG. 6). Two such battens—a substantially vertical batten 242, and a substantially diagonal batten 243—are schematically illustrated in dotted line (within the vane 240 material) in FIG. 5. The battens 242, 243 are preferably removed before the turbine 215 is collapsed (moved to the inoperative position of FIG. 6). Substantially horizontal battens may also be used, and they need not necessarily be removed before movement to the FIG. 6 position.

Exactly how the vanes 240 are connected to the spokes 223, etc., may vary widely. In FIG. 1 an open helical wind turbine is illustrated. That is, the vane support 221 is offset from the supports 220, 222, so that the vane 240 material twists into a helix from the top to the bottom of the shaft 17. In this embodiment, the vane 240 material is simply attached to the spokes 223-226 by a suitable adhesive.

In the Savonius embodiment of FIGS. 5 & 6, the vane 240 material is shown connected to the spokes 223-226 by stitching. For example, the top and bottom ends 245, 246, respectively, of the vane 240 material is wrapped around the spokes 223 (seen most clearly in FIG. 5) of the upper and lower vane supports 220, 222, respectively, and stitched tightly in place by the stitches 247. For the spoke 223 of the central vane support 221, the material of the vane 240 may be attached by one or more fasteners (e.g. staples 248), adhesive, and/or pocket material 249. The pocket material 249—which like the vane material is substantially inextensible—is moved tightly into place into contact with the spoke 223, and then securely held in place by stitches 250.

While not necessary under all circumstances, in order to insure proper alignment of the cooperating spokes of the various vane supports 220-222 [whether making the helix construction of FIG. 1 or the Savonius construction of FIGS. 5 & 6] it is desirable to provide some sort of key between the shaft 17 and hubs 227. For example, as seen most clearly in FIGS. 2 & 3, one or more vertically (during use) elongated radial projections (keys) 252 are provided extending interiorly from the hub 227 into the central bore 228 on at least the top 220 and center 221 vane supports. The projections are 252 keyed to the shaft 17 by inserting them into one or more substantially vertically elongated grooves 253 (seen most clearly in FIGS. 5 & 6) in the shaft 17. The number and relative positions of the projections 252 (and cooperating grooves 253) will determine whether various vane supports are offset from others. For the Savonius configuration of FIGS. 5 & 6, the projections 252 in at least the hubs 220, 221 will have substantially exactly the same orientation with respect to the spokes 223-226 so that all of the cooperating spokes are vertically aligned. For the helix configuration of FIG. 1, on the other hand, the projections 252 associated with the central vane support 221 may have a different position with respect to the spoke 223 than the projections 252 associated with the top vane support 220, to provide a "twist" in the vane 240.

Alternatively the radial projection(s) 252 may be on the shaft 17, and the groove(s) 253 in the central bore 228.

The bottom vane support 222 may be substantially permanently affixed to the shaft 17 (e.g. by welding and/or an adhesive), or also may be made slidable and releasably lockable in place like the supports 220, 221.

In use of the turbine 215, when in the operable position, the vane supports 220, 221 are slid along the shaft 217 (preferably with the projections 252 keyed to the grooves 253) until the openings 229, 233 align. Then locking pins (e.g. 231 or 232) are moved into place, locking the hubs 227 of the supports 220, 221 to the shaft 17. The vanes 240 are then taught, and the shaft 17 will be rotated by wind engaging the vanes 240, the force of the wind transmitted by the vanes 240, spokes 223-226, and vane supports 220-222 to the shaft 17. When one returns to the dock, or otherwise does not want the wind turbine 215 to operate, one simply releases the pins 231 or 232 (by hand, or using any suitable tool designed for that purpose). In the illustrated embodiment, this causes the vane supports 220-222 to move toward each other under the force of gravity, from the position of FIG. 5 to that of FIG. 6. That is, the wind turbine 215 collapses so that it no longer effectively functions as a wind turbine.

Instead of being moved manually, a modified form of the pin 231 may be provided that are automatically operated. For example, an electrically powered pin moving mechanism (not shown), such as a solenoid, may be mounted to at least the hub 227 of the top vane support 220 adjacent the hole 229. When a remote control actuator is operated, the powered pin moving mechanism may then move the pin 231 actuator 235, and then the pin 231 itself, to release the pin 231, thereby causing the top vane support 220 to collapse.

While particular mechanisms have been illustrated and described for connection of the vane supports 220-222 to the shaft 17, and the vanes 240 to the vane supports 220-222, it is to be understood that a wide variety of other conventional mechanisms are also possible for such attachments. Any conventional or hereafter developed structures which accomplish the same function are suitable.

Figures 7, 10:
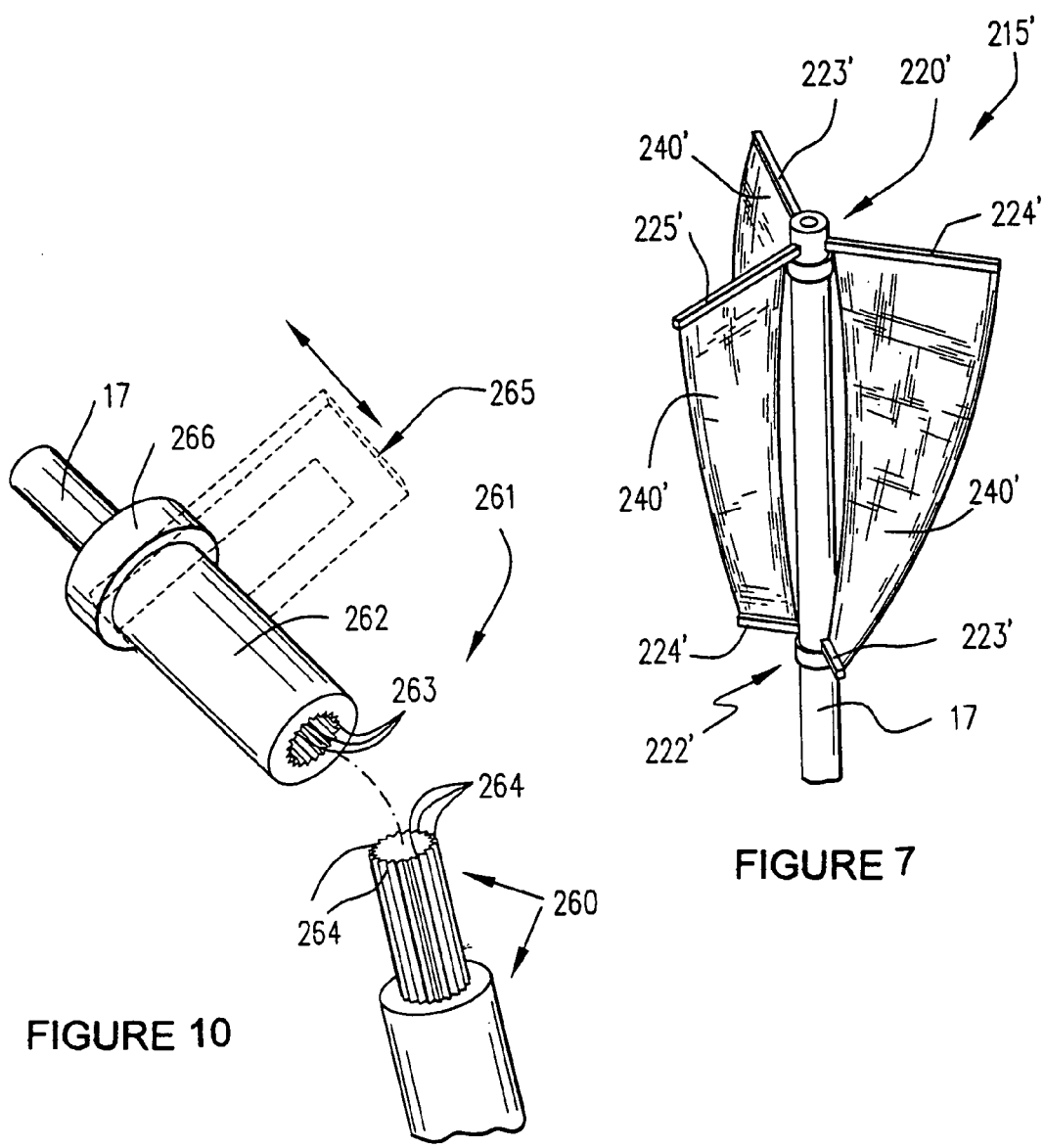
FIG. 7 is a schematic top perspective view of a modification of the wind turbine of FIG. 1 having spokes of the lower vane support of shorter length.
FIG. 10 is a schematic exploded perspective view of one form an exemplary clutch mechanism utilizable with the flexible drive shaft of FIGS. 8 & 9.

FIG. 7 schematically illustrates another form of collapsible vertical axis wind turbine according to the present invention. The major difference between the wind turbine 215' of FIG. 7 and the wind turbine 215 of FIG. 1 is that only two vane supports 220', 222' are provided, each with only three spokes 223'-225', and the spokes of the various supports are of different lengths. That is, the lengths of the spokes 223'-225' of the bottom vane support 222' are less than half the length of the spokes 223'-225' of the top support 220'. While this results in less surface area of the turbine 215', the operator of a watercraft on which the device 215' is mounted would have clearer sight lines at the bottom of the turbine 215'. Further, other vane supports and vanes may be mounted above the vane support 220' in FIG. 7, and the portions of the turbine above the support 220' may have a Savonius configuration rather than the helical configuration for the vanes 240' illustrated in FIG. 7.

Figure 8:
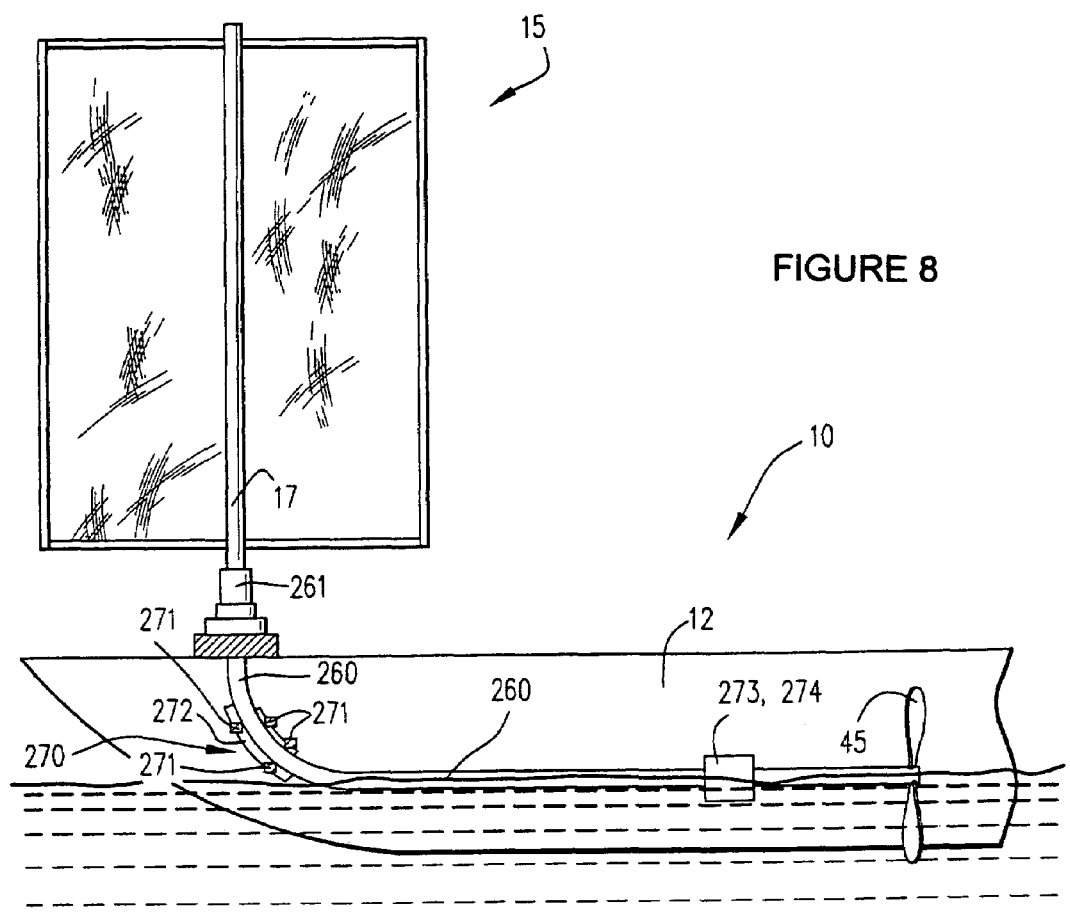
FIG. 8 is a side schematic view, partly in cross section, of a watercraft according to the invention showing a flexible drive shaft according to the invention.
Figure 9:
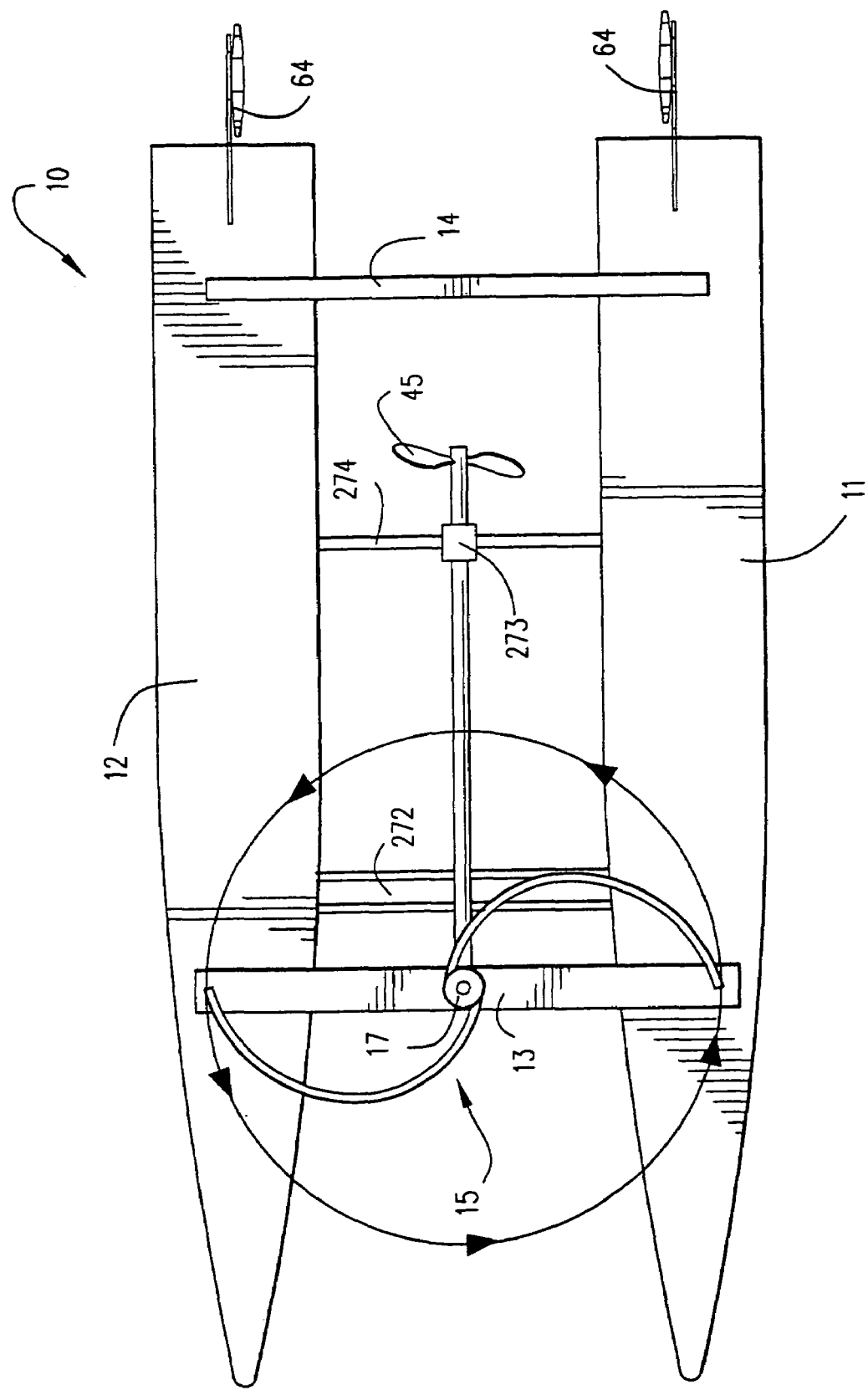
FIG. 9 is a top plan view of the watercraft of FIG. 8.

While the turbines 215, 215' may be used on land, they are particularly desirable when used on a watercraft, such as the catamaran 10 shown in FIGS. 8 & 9, having hulls 11 and 12, and crossbars 13, 14. The wind turbine 15 illustrated in FIGS. 8 & 9 is a conventional two component Savonius wind turbine, but the wind turbines 215, 215' (or other suitable wind turbines) may be substituted.

FIGS. 8 & 9 schematically illustrate one exemplary (only) embodiment of a wind turbine watercraft according to the invention. The watercraft, generally illustrated at 10, preferably comprises a multihull (a catamaran is shown, but trimarans, or other multihulls, may be used), e.g. having at least first and second hulls 11, 12. Any suitable multihull may be utilized, however a Hobiecat® (e.g. a sixteen-eighteen foot Hobie)—one of the most common and practical catamarans in the world—may be used as the basic structure (without sails or mast and other rigging). The catamaran 10 includes fore and aft crossbars 13, 14, and a vertical axis wind turbine 15 mounted on or adjacent the fore crossbar 13. Conventional rudders 64 are also provided.

The most significant novel feature of the FIGS. 8 & 9 embodiment is the use of a flexible drive shaft. Instead of using gears, or other transfer mechanisms, for transmitting the substantially vertical axis rotation of the wind turbine shaft 17 to the horizontal propeller 45, a flexible shaft 260 is provided which—as seen in FIG. 8—is able to bend substantially 75-90 degrees in connecting the turbine shaft 17 to the propeller 45. By using the flexible shaft 260, the losses associated with gearing are eliminated.

The horizontal propeller 45 is of conventional boat design, but preferably has a pitch as large as practical since boat speed is directly related to pitch. For example where the shaft 44 has a diameter of about one inch, the propeller 45 may have a diameter of about ten-fourteen inches (e.g. about 11 or 12 inches), and a pitch of at least nine inches (e.g. about sixteen inches).

The flexible shaft 260 may be constructed as illustrated and described in U.S. Pat. No. 4,832,571 or 5,820,464 (which are incorporated by reference herein). The shaft 260 may be integral with the shaft 17—that is, the shafts 17, 260 may be one piece. In such a circumstance, a clutch is not provided, however. Where a clutch is desirable, the shaft 17 may be distinct from the shaft 260, and a clutch 261 (see FIG. 8) provided therebetween.

The clutch 261 may be of any suitable conventional construction. One example, as illustrated in FIG. 10, is to provide a tube 262 keyed to the shaft 17 and having an interior with serrations 263. The serrations 263 cooperate with like grooves 264 on the upper (substantially vertical) portion of the flexible shaft 260. By pivoting or sliding the actuator 265—which cooperates with collar 266 on tube 262—upwardly, the tube moves out of contact with the flexible shaft 260, so that rotation of the shaft 17 is not transmitted to rotation of the propeller 45. When the actuator 265 is slowly moved back downwardly, the serrations 263 and grooves 264 re-engage, so that the shaft 17 again drives the propeller 45.

If desirable, where the flexible shaft 260 makes its primary bend—as shown schematically at 270 in FIG. 8—low friction bearing material blocks or elements 271 may be provided to insure smooth rotation or the shaft 260, like the bearing eleven illustrated in U.S. Pat. No. 4,832,571. The bearing elements 271 may be supported by any suitable cross pieces 272 extending between the hulls 11, 12. Another conventional bearing 273, supported by cross piece 274, may also be provided adjacent the propeller 45 to further insure proper rotation of the shaft 260 to drive the propeller 45.

It is desirable to mount the flexible shaft 260—as seen in FIG. 8—so that during normal loading of the craft 10, roughly half of the propeller 45 is in the water, and half out. This propeller positioning may also be used with conventional shafts, that is not just with the flexible shaft 260.

In order to allow the craft 10 to move through the water most smoothly, at least the portions of the hulls 11, 12 normally engaging the water should be made of, or coated with, a low friction material. For example, the hulls may be made of fiberglass with a smooth gel-coat, or most desirably made of marine-grade polyethylene (e.g. Roplene®). Roplene is naturally buoyant, has about five times the impact resistance of fiberglass, has about the same weight as fiberglass, and does not need gel-coats or paint to be maintained or have very low friction (e.g. a coefficient of friction of about 0.003004).

Figure 11:
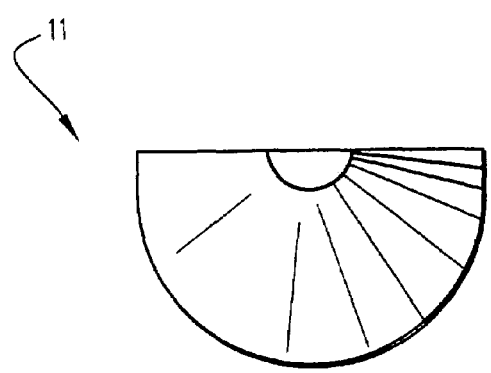
FIG. 11 is a front view of an exemplary football shaped hull of a catamaran according to the present invention.

The cross-sectional shape of the hulls 11, 12 that typically are in contact with water also affects the ease of movement of the craft 10 through the water. For example, an eighteen foot commercially available Hobiecat catamaran has a better shape for use with the invention than does the sixteen foot one. The optimum configuration—as illustrated schematically for the hull 11 in FIG. 11—is generally football-shaped (half a football) in cross-section. FIG. 11 is a front end view of the hull 11.

In the description all numerical values are approximate, and all narrow ranges within a broad range are specifically disclosed herein (e.g. a propeller diameter of about 10-14 inches includes 9.99-11.1, 12-13, 11.5-14.02, and all other narrow ranges within that broad range). The invention is to be accorded the broadest interpretation of the appended claims to encompass all equivalent devices and methods, and the broadest interpretation allowable considering the prior art.

What is claimed is:

1. A vertically collapsible vertical axis wind turbine comprising: a substantially vertical shaft; at least two vane supports mounted by the shaft; and at least two vertically collapsible material vanes supported by the vane supports, so that the vanes are movable from a first operative position in which the vane material is substantially taut, to a second inoperative position in which the vane material collapses and is not taut; and wherein the vane supports are positioned, and the vanes are constructed, so that the wind turbine has a Savonius configuration.

2. A vertically collapsible vertical axis wind turbine as recited in claim 1 wherein at least one of the vane supports comprises a first vane support mounted to the shaft by a locking device, the locking device removable to allow movement of the first vane support with respect to other vane supports along the shaft.

3. A vertically collapsible vertical axis wind turbine as recited in claim 1 wherein the vanes are made of kite or high performance sail material, and wherein at least one vane includes at least one substantially vertical or substantially diagonal removable batten therein.

4. A vertically collapsible vertical axis wind turbine as recited in claim 2 comprising at least three vane supports vertically spaced from each other on the shaft, and a second vane support mounted to the shaft by a removable locking device.

5. A vertically collapsible vertical axis wind turbine comprising: a substantially vertical shaft; at least two vane supports mounted by the shaft; and at least two vertically collapsible material vanes supported by the vane supports, so that the vanes are movable from a first operative position in which the vane material is substantially taut, to a second inoperative position in which the vane material collapses and is not taut; and wherein at least one of the vane supports comprises a first vane support mounted to the shaft by a locking device, the locking device removable to allow movement of the first vane support with respect to other vane supports along the shaft.

6. A vertically collapsible vertical axis wind turbine as recited in claim 5 wherein the vane supports are positioned, and the vanes are constructed, so that the wind turbine has an open helix configuration.

7. A vertically collapsible vertical axis wind turbine as recited in claim 5 wherein the first vane support comprises the top vane support.

8. A vertically collapsible vertical axis wind turbine as recited in claim 5 wherein the locking device comprises a locking pin extendable through aligned substantially horizontal openings in the shaft and first vane support.

9. A vertically collapsible vertical axis wind turbine comprising: a substantially vertical shaft; at least two vane supports mounted by the shaft; and at least two vertically collapsible material vanes supported by the vane supports, so that the vanes are movable from a first operative position in which the vane material is substantially taut, to a second inoperative position in which the vane material collapses; and wherein each vane support comprises a hub having a central substantially vertical bore, and a plurality of curved spokes extending generally radially outwardly from the hub and operatively connected to a vane.

10. A vertically collapsible vertical axis wind turbine as recited in claim 9 wherein the hub central bore and the shaft have at least one radially extending projection and vertically elongated groove which cooperate to key the vane support to the shaft.

11. A vertically collapsible vertical axis wind turbine as recited in claim 10 wherein the at least one radial projection is in the hub central bore and the at least one vertically elongated groove is in the shaft.

12. A vertically collapsible vertical axis wind turbine as recited in claim 9 wherein each vane support has at least three spokes spaced substantially uniformly around the hub.

13. A vertically collapsible vertical axis wind turbine as recited in claim 9 wherein the spokes of the lowest vane support on the shaft have a smaller radial dimension than the spokes of a vane support above them, so that the vane is tapered radially inwardly from the above vane support to the lowest vane support.

14. A vertically collapsible vertical axis wind turbine as recited in claim 9 wherein at least one of the vane supports comprises a first vane support mounted to the shaft by a locking device, the locking device removable to allow movement of the first vane support with respect to other vane supports along the shaft.

15. A vertically collapsible vertical axis wind turbine as recited in claim 9 comprising at least three vane supports vertically spaced from each other on the shaft, including at least first and second vane supports mounted to the shaft by a removable locking element.

16. A vertically collapsible vertical axis wind turbine as recited in claim 9 operatively mounted to at least one hull of a multihull watercraft, and in combination with a propulsion mechanism operatively mechanically connected to said turbine shaft.

17. A multihull watercraft comprising: a plurality of hulls; a propulsion mechanism operatively mounted between two of the hulls; a vertically collapsible Savonius or open helix vertical axis wind turbine operatively mounted to at least one hull, the wind turbine having a shaft; and an operative mechanical connection between the wind turbine shaft and the propulsion mechanism.

18. A multihull watercraft as recited in claim 17 further comprising at least two vane supports mounted by the shaft and at least two vertically collapsible material vanes supported by the vane supports, so that the vanes are movable from a first operative position in which the vane material is substantially taut, to a second inoperative position in which the vane material collapses and is not taut.

19. A multihull watercraft as recited in claim 17 wherein the propulsion mechanism comprises a substantially horizontal propeller and wherein the operative connection between the wind turbine shaft and propeller comprises a flexible shaft having at least about a 70 degree bend therein.

20. A watercraft comprising: a watercraft body; a vertical axis wind turbine having a substantially vertical shaft mounted with respect to the body for rotation with respect to the body; a substantially horizontal propeller mounted to the body for rotation about a generally horizontal axis; and a flexible shaft having at least about a 70 degree bend therein operatively connecting the wind turbine shaft to the substantially horizontal propeller and a manually actuated clutch between the wind turbine shaft and the flexible shaft, the clutch positioned above the flexible shaft bend.

21. A multihull watercraft comprising: a plurality of hulls, having at least portions thereof which normally engage water made of low friction marine grade polyethylene; a substantially horizontal propeller having a diameter of at least about ten inches and operatively mounted between two of said hulls; a vertical axis wind turbine operatively mounted to at least one hull, said wind turbine having a shaft; and an operative mechanical connection between said wind turbine shaft and said propeller.

\* \* \* \* \*